(12) United States Patent
Lescroart et al.

(10) Patent No.: US 10,953,803 B2
(45) Date of Patent: Mar. 23, 2021

(54) FOLD REAR-VIEW MIRROR ASSEMBLY FOR MOTOR VEHICLES

(71) Applicant: FICOSA INTERNATIONAL (TAICANG) CO. LTD., Jiangsu (CN)

(72) Inventors: Bruno Lescroart, Jiangsu (CN); YongQiang Fang, Jiangsu (CN); Liang Xue, Jiangsu (CN)

(73) Assignee: FICO INTERNATIONAL (TAICANG) CO. LTD., Jiangsu (CN)

( * ) Notice: Subject to any disclaimer, the term of this patent is extended or adjusted under 35 U.S.C. 154(b) by 211 days.

(21) Appl. No.: 16/072,782

(22) PCT Filed: Jan. 28, 2016

(86) PCT No.: PCT/CN2016/072449
§ 371 (c)(1),
(2) Date: Jul. 25, 2018

(87) PCT Pub. No.: WO2017/128164
PCT Pub. Date: Aug. 3, 2017

(65) Prior Publication Data
US 2019/0061627 A1    Feb. 28, 2019

(51) Int. Cl.
*B60R 1/076*    (2006.01)

(52) U.S. Cl.
CPC .................... *B60R 1/076* (2013.01)

(58) Field of Classification Search
CPC .......... B60R 1/076; B60R 1/074; B60R 1/06; B60R 1/0617; B60R 1/006; B60R 1/072; B60R 1/066; B60R 2011/0082
(Continued)

(56) References Cited

U.S. PATENT DOCUMENTS 8,690,366 B2 *    4/2014    Sakata ................ B60R 1/076
                                                        359/872
8,998,431 B2      4/2015    Tseng
                            (Continued)

FOREIGN PATENT DOCUMENTS

CN    201268272 Y    7/2009
CN    102189961 A    9/2011
                (Continued)

OTHER PUBLICATIONS

International Search Report for International Application Serial No. PCT/CN2016/072449; International Filing Date Jan. 28, 2016; Report dated Oct. 17, 2016; 4 pages.
(Continued)

*Primary Examiner* — Jade R Chwasz
(74) *Attorney, Agent, or Firm* — Cantor Colburn LLP

(57) ABSTRACT

A fold rear-view mirror assembly (100) for motor vehicles is disclosed. It comprises a base member (120) to be mounted on a motor vehicle, a mirror housing (110), a shaft (140) for rotation of the mirror housing (110) to the base member (120) between operative and folded conditions, an elastic element (160) associated with the shaft (140) for applying a force on the base member (120) and the mirror housing (110), and a retaining mechanism (200) comprising a locking member (260) carrying a retaining element (250) clamped therein such that it can be moved to the locking member (260) between a release position where it can be moved to the shaft (140), and a lock position where it is received in a shaft recess (142) causing the retaining element (250) to be locked to the shaft (140) so that the elastic element (160) is axially retained against the locking member (260).

18 Claims, 3 Drawing Sheets

(58) Field of Classification Search
USPC .......................................................... 359/841
See application file for complete search history.

(56) References Cited

U.S. PATENT DOCUMENTS

| | | |
|---|---|---|
| 2004/0233557 A1 | 11/2004 | Pavao et al. |
| 2009/0086351 A1 | 4/2009 | Sakata |
| 2011/0255188 A1 | 10/2011 | Watanabe |

FOREIGN PATENT DOCUMENTS

| | | | |
|---|---|---|---|
| CN | 104175961 A | | 12/2014 |
| CN | 104290663 A | | 1/2015 |
| JP | 2003028222 A | * | 1/2003 |
| JP | 2003028222 A | | 1/2003 |
| KR | 100633411 B1 | | 10/2006 |

OTHER PUBLICATIONS

Written Opinion for International Application Serial No. PCT/CN2016/072449; International Filing Date Jan. 28, 2016; Report dated Oct. 17, 2016; 4 pages.

* cited by examiner

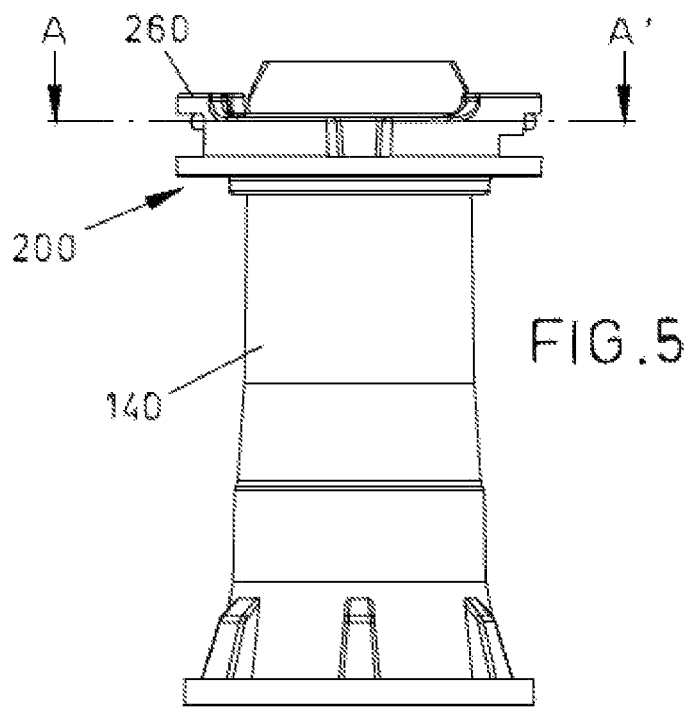
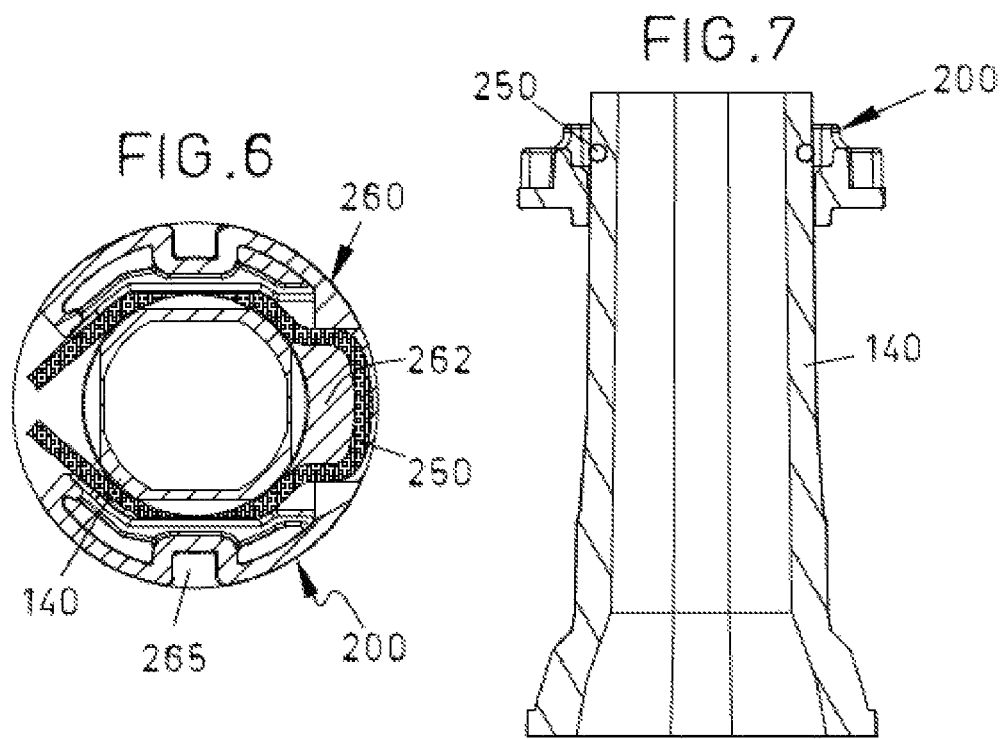

FOLD REAR-VIEW MIRROR ASSEMBLY FOR MOTOR VEHICLES

CROSS-REFERENCES TO RELATED APPLICATIONS

This application is a National Stage application of PCT/CN2016/072449 filed Jan. 28, 2016, which is incorporated herein by reference in its entirety.

The present disclosure relates to fold rear-view mirror assemblies for motor vehicles and methods for assembling and disassembling them.

BACKGROUND ART

Known rear-view mirror assemblies comprise a base member for being mounted on a suitable outer portion of motor vehicles, and a mirror housing adapted for receiving a mirror pane therein. The mirror housing is arranged so that it can be rotated relative to the base member around a mirror rotation axis between at least a mirror operative condition, or drive position, and a mirror folded condition, or parking position, and vice versa.

A shaft is provided for rotation of the mirror housing relative to the base member. A compression spring is also provided surrounding the shaft so that it is compressed against a stop. Rotation of the mirror housing relative to the base member around the shaft causes the mirror housing to be displaced vertically relative to the base member compressing said spring until a determined mirror condition, such as said mirror folded position, has been reached. Then, the mirror housing is displaced downwards again relative to the base member releasing said spring.

The above mentioned stop against which the spring is compressed upon rotation of the mirror housing relative to the base member may be for example a push nut as disclosed in US2011255188. This push nut has elastic portions for clipping to the shaft. Due to elasticity of the elastic portions and the force of the spring an opening preventing portion is required to be formed on the shaft to avoid the elastic portions from being deformed from the inside to the outside in the radial direction of the shaft.

In order to avoid the need for an opening preventing portion to be securely mounted on the shaft, US2009086351 provides a stopper made of resin that is fixed to the shaft for compressing the spring. The stopper is a ring-shaped main body made of an elastic resin with a plurality of engaging nails arranged along an inner peripheral surface of the main body and elastically engaged with an engaging portion. As the shaft is inserted, the main body is elastically deformed and each of the engaging nails is brought into contact with the contacting portion. The main body elastically returns to an original shape when each of the engaging nails reaches the engaging portion.

In the rear-view mirror assembly disclosed in US2004233557, a spring clip fixedly positioned around the shaft is used as a stop of the spring. The spring clip has an inner retaining tab portion for engaging the shaft as it is press fitted thereon. In this rear-view mirror assembly, a bracing member is required between the spring and the spring clip to avoid direct contact therebetween. The spring clip is engaged with the bracing member so that it is locked in an upward longitudinal movement to the shaft.

None of the above prior art rear-view mirror documents provide a rear-view mirror assembly whose spring can be easily assembled and disassembled while its compression function is still performed efficiently. There is thus a need for a rear-view mirror assembly having a stop member for the spring that can be easily fitted into and removed from the shaft while performing a spring compression function efficiently.

SUMMARY

The present fold rear-view mirror assembly comprises a base member for being mounted on a motor vehicle and a mirror housing for receiving a mirror pane therein. The mirror housing is arranged so that it can be rotated relative to the base member around a mirror rotation axis between at least a mirror operative condition, or drive position, and a mirror folded condition, or parking position, and vice versa.

A shaft is provided such that the mirror housing is allowed to be rotated relative to the base member between said operative and folded conditions and vice versa. Associated with the shaft is an elastic element, such as for example a compression spring, arranged such that a force is applied on both the base member and the mirror housing.

The present fold rear-view mirror assembly further includes a retaining mechanism. The retaining mechanism comprises a locking member adapted for carrying a flexible retaining element clamped therein. The locking member may have at least one stop portion adapted for limiting movement of the flexible retaining element between the release and lock positions.

As used herein, the feature that a flexible retaining element is clamped in the locking member means that the retaining element is in general fastened, tightened, gripped, pressed or otherwise held therewith such that the flexible retaining element can be moved relative to the locking member between at least two different positions:
  a release position, in which the flexible retaining element can be moved relative to the shaft, and
  a lock position, in which the flexible retaining element is received in a recess formed in the shaft causing the flexible retaining element to be locked to the shaft so that the elastic element is axially retained against the locking member.

The flexible retaining element, which may be embodied for example in the form of a flat spring, acts as a stop for the elastic element mounted around the shaft and can be removed easily from the shaft.

The locking member is capable of retaining the flexible retaining element locked to the shaft in the locked position. In this case, the locking member may comprise at least one portion such as a wall or protrusion adapted to limit deformation in the locked position, such as a deformation in a direction that is radial to the shaft of the flexible retaining element, so as to retain the retaining element locked to the shaft.

The shaft may include at least one sloped surface. As the retaining element slides on the sloped surface as it is mounted on the shaft, it is expanded prior to be received in the shaft recess.

The flexible retaining element may be shaped to at least partly mate a section of the shaft along the shaft recess and sized such that, when received in the shaft recess, the flexible retaining element is in one of a relaxed or a stretched state. In other words, the flexible retaining element may be sized such that it substantially corresponds to a shaft section along the shaft recess such that the flexible retaining element is relaxed in the lock position or, alternatively, the flexible retaining element may be sized such that it is smaller than said shaft section along the shaft recess such that the flexible retaining element is expanded in the lock position.

The flexible retaining element may have at least one hooking portion formed at one end thereof. The hooking portion may be for example an at least substantially curved free end portion adapted for preventing the flexible retaining element from being removed from the locking member. This helps with the pre-assembly of the flexible retaining element, although the provision of a flexible retaining element with hooking end portions is not essential.

Combined with the above described features of the present fold rear-view mirror assembly, at least one of the following additional features may be also included.

For example, the present fold rear-view mirror assembly may further include a motor configured to provide rotation of the mirror housing around the mirror base. Associated with the motor, drive means may be also provided comprising a gear wheel engaging the motor with the base member for driving the mirror housing in rotation relative to the base member around the mirror rotation axis between at least the drive position and the parking position, and vice versa. The gear wheel may be disposed, for example, coaxially with the mirror rotation axis.

The present fold rear-view mirror assembly may also include an illumination module. An imaging device may be provided for imaging an image of the surroundings of the vehicle.

A mirror pane is usually provided housed in the mirror housing and positioned so as to provide a substantially rear field of view to a vehicle driver when the mirror housing is positioned in the driving position. In some examples, the mirror housing may be adapted for receiving the imaging device configured for imaging an image of the surroundings of the vehicle, such as a video camera. The mirror pane may also include a heating element. In other examples, an actuation mechanism may be provided to provide orientation of the mirror pane to adjust the rear field of view of the vehicle driver.

A number of different configurations for said mirror pane are possible. It may be for example an anti-glare mirror pane, such as a mirror pane using a cell of electrically changeable optical characteristic or a mirror pane using a liquid filtering layer of variable thickness. Examples of cells of electrically changeable optical characteristic are liquid-crystal and electrochromic mirrors. In further examples, the mirror pane may further comprise a heating element. An anti-glare mirror pane might be housed in the mirror housing and positioned so as to provide a substantially rear field of view to a vehicle driver when the mirror housing is positioned in the driving position. Also, a spotter mirror might be housed in the mirror housing and positioned so as to substantially provide vision of a vehicle blind spot region to the vehicle driver when the mirror housing is positioned in the driving position.

The present fold rear-view mirror assembly may also include an antenna for communicating with a radio-frequency reception system, an outdoor temperature sensing device to sense an outdoor temperature of the vehicle, etc.

On the other hand, the base member may be provided with recesses formed therein for cooperating with corresponding projections formed in the mirror housing. Recesses and projections are part of a detent mechanism for locking the mirror housing in specific stable angular positions to the base member.

Rotation of the mirror housing relative to the base member causes the projections of the mirror housing to slide relative to the recesses of the base member causing the mirror housing to be displaced vertically relative to the base member compressing a main spring until a mirror condition, such as a mirror folded or parking position, has been reached. Then, the mirror housing is displaced downwards again relative to the base member releasing the main spring. The process for turning the mirror housing back to the mirror operative condition, or driving position, is the same as disclosed but in the reverse order. The mirror housing recesses may be provided instead in the gear wheel in motorized examples.

For assembling the above described fold rear-view mirror assembly a retaining mechanism with a locking member having a flexible retaining element clamped therein is first provided. Then, the locking member is inserted into the shaft of the rear-view mirror assembly against the elastic element arranged therebetween. This causes the flexible retaining element to be received in a shaft recess so as to axially retain the elastic element against the locking member. This might also cause the elastic element to expand as it slides onto a shaft sloped surface until it is received in the shaft recess.

For disassembling the present mirror assembly, a force is applied on the retaining mechanism against the elastic element. The retaining mechanism is rotated so as to cause it to expand to come out of the shaft reduced diameter portion and out of the shaft recess. The force applied is then released to the retaining mechanism.

The present fold rear-view mirror assembly has the advantage that the flexible retaining element can be removed easily and quickly from the shaft. Advantageously, one push load is simply required for retaining the locking member. The locking member locks itself by the force of the elastic element. In addition, the retaining mechanism with the locking member and the flexible retaining element clamped therein can be preassembled in a production line different from that of the rear-view mirror assembly. For disassembling, only a press downward force and a rotation of the locking member are required.

Additional objects, advantages and features of the present disclosure will be clear to those skilled in the art upon examination of the description, or may be learned by practice thereof.

BRIEF DESCRIPTION OF THE DRAWINGS

A particular example of the present fold rear-view mirror assembly will be described in the following by way of non-limiting examples, with reference to the appended drawings, in which:

FIG. 5 is a front elevational view of the shaft;

FIG. 6 is a cross sectional view taken along line A-A' of the shaft shown in FIG. 5; and FIG. 7 is a longitudinal sectional view of the shaft shown in FIG. 5.

DETAILED DESCRIPTION OF EXAMPLES

Figure 1:
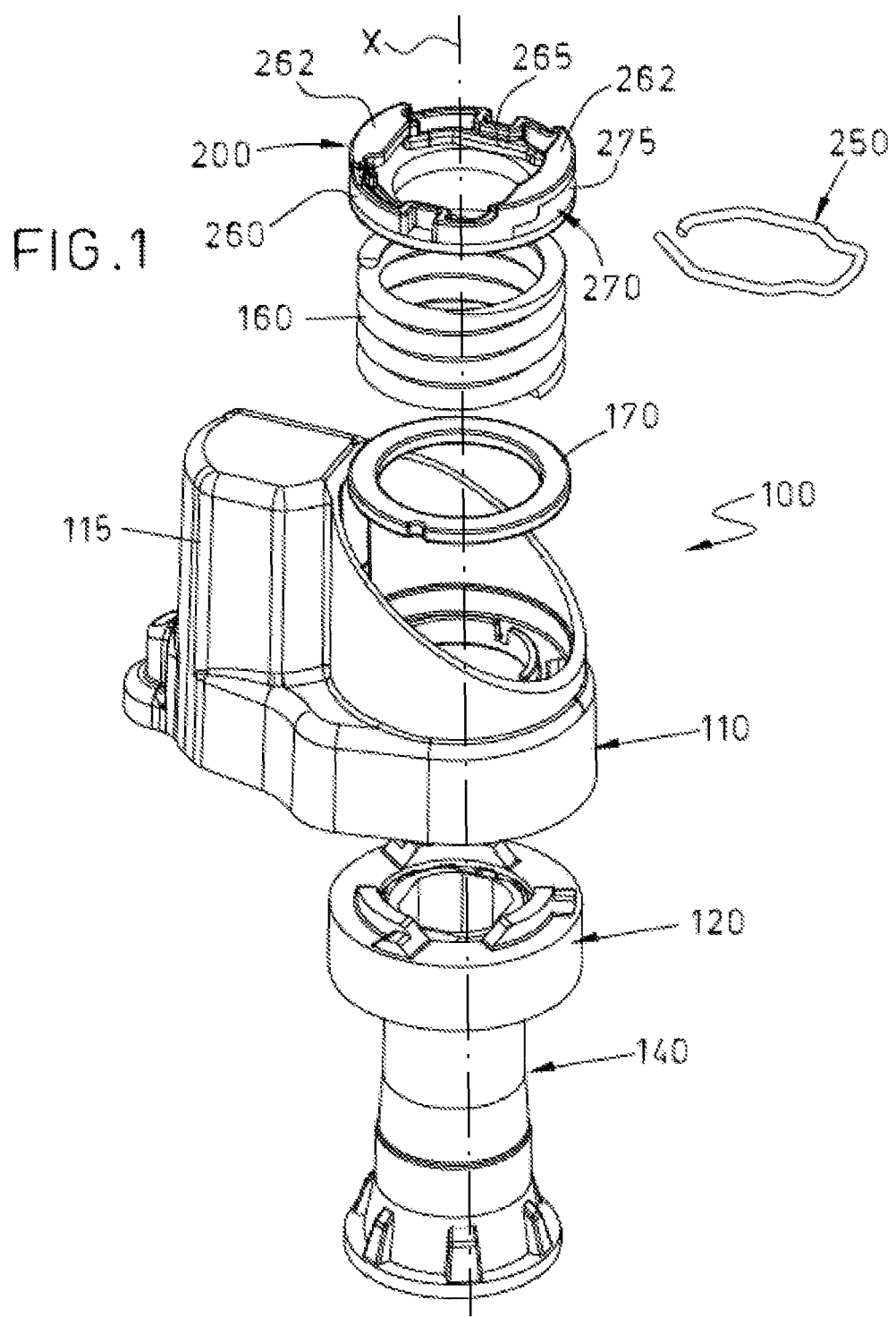
FIG. 1 is an exploded perspective view of one example of the present fold rear-view mirror assembly.

In the example shown in figures, the rear-view mirror assembly 100 comprises a mirror housing 110 and a base member 120. The base member 120 is intended to be mounted on a suitable outer portion of a motor vehicle, not shown in the drawings. The mirror housing 110 can be rotated relative to the base member 120 around a mirror rotation axis X between a mirror operative condition (drive position) and a mirror folded condition (parking position), and vice versa. A sliding track 170 is provided for facilitating rotation of the mirror housing 110 to the base member 120.

The mirror housing 110 is adapted for receiving a mirror pane therein (not shown). The mirror housing 110 further includes a motor housing 115 for receiving therein a motor (not shown) to provide rotation of the mirror housing 110 around the mirror base 120. The motor housing 115 is also adapted for receiving therein drive means (not shown) associated with the motor comprising a gear wheel engaging the motor with the base member 120 for driving the mirror housing 110 in rotation.

In order to allow the mirror housing 110 to be rotated around the mirror rotation axis X between said mirror operative and folded positions, a shaft 140 and an elastic element 160 associated therewith are provided. In the example shown in the drawings, the elastic element 160 is a compression spring that is arranged around the shaft 140 such that a compression force is applied both on the base member 120 and the mirror housing 110.

The compression spring 160 applies said compression force due to the provision of a retaining mechanism 200. The retaining mechanism 200 comprises a locking member 260 that is adapted for carrying a flexible retaining element 250 clamped therein. In the example shown in the figures, the retaining element 250 is in the form of a lock spring.

Figure 4:
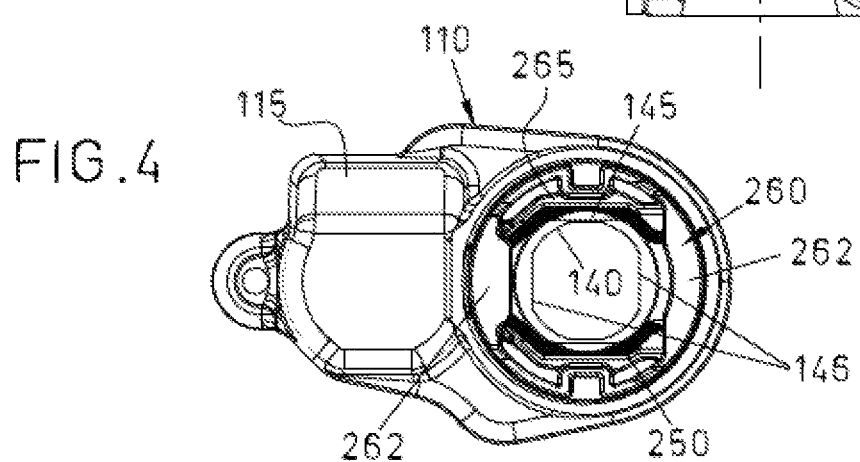
FIG. 4 is a top plan view of the retaining mechanism shown in FIGS. 2 and 3.

As shown in FIGS. 1 and 4 and FIG. 6, the locking member 260 has stop portions 262. The stop portions 262 are adapted for limiting movement of the lock spring 250 between the release position and the lock position.

Figure 3:
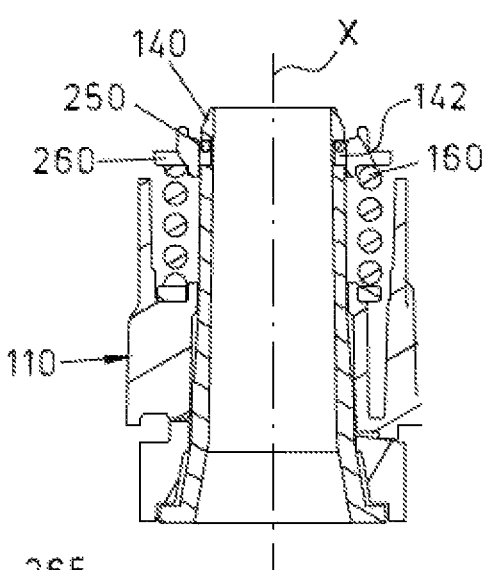
FIG. 3 is cross-sectional view of the retaining mechanism shown in FIG. 2.

In use, and once duly inserted in the locking member 260, the lock spring 250 is clamped into the locking member 260, as shown in FIGS. 3 and 6, such that it can be moved relative thereto. Specifically, the lock spring 250, that is clamped into the locking member 260, can be moved (vertically along axis X in the drawings) between a first release position, in which the lock spring 250 can be moved relative to the shaft 140, and a second, lock position, in which the lock spring 250 is received in a recess 142 that is formed in the shaft 140 as shown in FIG. 3. In this lock position of the lock spring 250, the lock spring 250 is locked to the shaft 140 so that the spring 160 is axially retained and compressed against the locking member 260. The spring 160 is thus retained by lock spring 250 in position through one push locking action as it will be explained further below.

The locking member 260 comprises at least one portion adapted to limit deformation of the lock spring 250 in a direction radial to the shaft 140 in the locked position so as to retain it locked to the shaft 140. In the example shown in the figures, said portion is a wall 265.

Figure 2:
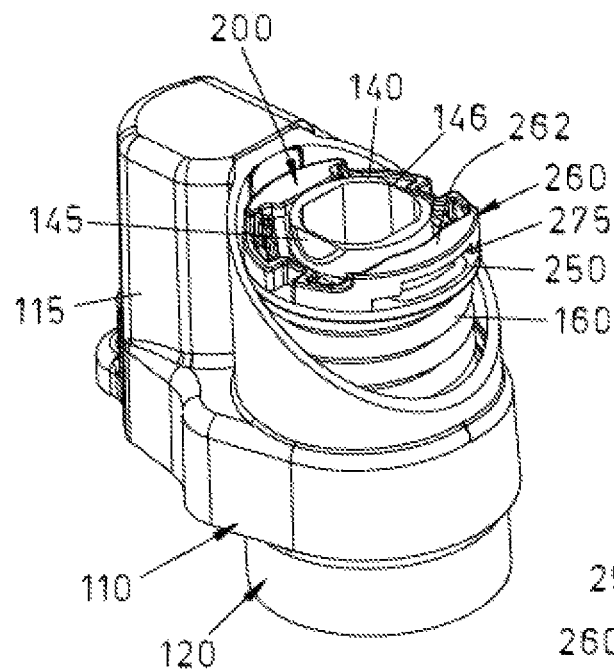
FIG. 2 is a fragmentary perspective view showing the retaining mechanism mounted in the mirror assembly.

As shown in FIGS. 2 and 4, the shaft 140 includes two opposite sloped surfaces 145. The sloped surfaces 145 are adapted so that the lock spring 250 slides thereon. Thus, as the locking member 260 is inserted in the shaft 140, the lock spring 250 is expanded prior to be received in the recess 142 of the shaft 140.

For assembling the above described fold rear-view mirror assembly 100 a retaining mechanism 200, which is preassembled with a locking member 260 with a lock spring 250 clamped therein, is first provided. A preassembled locking assembly 250, 260 is thus provided to be mounted on the shaft 140. Said locking assembly 250, 260 is formed by pushing the lock spring 250 radially into the locking member 260 through an opening 270 that is formed in the locking member 260 as shown in FIG. 2. A recess 275 is formed in said opening 270 to facilitate radial insertion of the locking member 260. As the lock spring 250 is pushed radially into the locking member 260, the lock spring 250 is retained therein with no tension and prevented from sliding out.

The preassembled locking assembly 250, 260 is then inserted into the shaft 140 against the spring 160 that is arranged therebetween. Insertion of the locking member assembly 250, 260 into the shaft 140 causes the lock spring 250 to expand as it slides upon the above mentioned sloped surfaces 145 of the shaft 140 until it is received in the above mentioned corresponding recesses 142 of the shaft 140. This causes the spring 160 to be axially retained against the locking member 260.

For disassembling the locking assembly 250, 260, starting from a locking condition of the lock spring 250 to the locking member 260, a force should be applied on the locking member 260 against the spring 160 while rotating the locking member 260 relative to the shaft 140. This causes the lock spring 250 to expand such that it comes out of the recess 142 of the shaft 140. Then, the force on the locking member 260 can be released.

Although only a number of particular examples of the fold present rear-view mirror assembly have been disclosed herein, it will be understood by those skilled in the art that other alternative examples and/or uses and obvious modifications and equivalents thereof are possible. Furthermore, the present disclosure covers all possible combinations of the particular examples described.

Reference signs related to drawings and placed in parentheses in a claim, are solely for attempting to increase the intelligibility of the claim, and shall not be construed as limiting the scope of the claim. Thus, the scope of the present disclosure should not be limited by particular examples, but should be determined only by a fair reading of the claims that follow.

The invention claimed is:

1. A fold rear-view mirror assembly comprising:
 a base member adapted to be mounted on a motor vehicle;
 a mirror housing;
 a shaft arranged to effect rotation of the mirror housing relative to the base member between a mirror operative condition and a mirror folded condition;
 an elastic element associated with the shaft and arranged such that a force is applied on both the base member and the mirror housing; and
 a disengageable retaining mechanism comprising a locking member coupled to a flexible lock spring clamped therein, and the flexible lock spring being movable to the locking member between at least a release position, in which the flexible lock spring can be moved relative to the shaft, and a lock position, in which the flexible lock spring is received in a recess formed in the shaft causing the flexible lock spring to be locked to the shaft so that the elastic element is axially retained against the locking member, wherein the recess is circumferentially discontinuous to facilitate release of the disengageable retaining mechanism, and the flexible lock spring is resiliently flexible.

2. The fold rear-view mirror assembly according to claim 1, wherein the locking member is adapted to retain the flexible lock spring locked to the shaft in the lock position.

3. The fold rear-view mirror assembly according to claim 2, wherein the locking member comprises at least one portion adapted to limit deformation of the flexible lock spring in the lock position so as to retain the flexible lock spring locked to the shaft.

4. The fold rear-view mirror assembly according to claim 3, wherein the at least one portion is adapted to limit deformation of the flexible lock spring in a direction radial to the shaft.

5. The fold rear-view mirror assembly according to claim 4, wherein the shaft includes at least one sloped surface upon which the flexible lock spring is adapted to slide causing the flexible lock spring to expand prior to receipt in the shaft recess.

6. The fold rear-view mirror assembly according to claim 5, wherein the flexible lock spring is shaped to at least partly mate a section of the shaft along the shaft recess.

7. The fold rear-view mirror assembly according to claim 6, wherein the flexible lock spring is sized such that, when received in the shaft recess and in the lock position, the flexible lock spring is resiliently expanded and in radially biased contact with the shaft.

8. The fold rear-view mirror assembly according to claim 6, wherein the flexible lock spring is sized such that, when received in the shaft recess, the flexible lock spring is in a relaxed state.

9. The fold rear-view mirror assembly according to claim 1, wherein the locking member comprises a locking washer inside of which the shaft can be inserted.

10. The fold rear-view mirror assembly according to claim 1, wherein the flexible lock spring has at least one hooking portion adapted for preventing the flexible lock spring from being removed from the locking member.

11. The fold rear-view mirror assembly according to claim 1, wherein the flexible lock spring is radially clamped inside the locking member and is adapted to move within the locking member between the release and lock positions when assembled.

12. The fold rear-view mirror assembly according to claim 1, wherein the locking member has at least one stop portion adapted for limiting movement of the flexible lock spring between the release and lock positions.

13. The fold rear-view mirror assembly according to claim 1, further comprising at least one of:
(i) an illumination module;
(ii) an imaging device configured for imaging an image of the surroundings of the vehicle;
(iii) a motor configured to provide rotation of the mirror housing around the mirror base;
(iv) a mirror pane housed in the mirror housing and positioned to provide a substantially rear field of view to a vehicle driver when the mirror housing is positioned in a driving position;
(v) an anti-glare mirror pane housed in the mirror housing and positioned to provide a substantially rear field of view to a vehicle driver when the mirror housing is positioned in the driving position;
(vi) a mirror pane housed in the mirror housing and positioned to provide a substantially rear field of view to a vehicle driver when the mirror housing is positioned in the driving position comprising a heating element;
(vii) a spotter mirror housed in the mirror housing and positioned to substantially provide vision of a vehicle blind spot region to the vehicle driver when the mirror housing is positioned in the driving position;
(viii) an antenna adapted to provide communication with a radio-frequency reception system;
(ix) an actuation mechanism configured to provide orientation of the mirror pane to adjust the rear field of view of the vehicle driver; and
(x) an outdoor temperature sensing device configured to sense an outdoor temperature of the vehicle.

14. A method for assembling a fold rear-view mirror assembly for a motor vehicle, the method comprising:
radially inserting a flexible retaining element into a locking member;
providing a disengageable retaining mechanism with the locking member having the flexible retaining element clamped therein; and
axially inserting a shaft of the mirror assembly inside the locking member against an elastic element arranged therebetween, wherein the axial insertion causes the flexible retaining element to be received in a shaft recess so as to axially retain the elastic element against the locking member.

15. The method according to claim 14, wherein the step of inserting the shaft inside the locking member causes the flexible retaining element to expand as it slides upon a shaft sloped surface until the flexible retaining element is received in the shaft recess.

16. A method for disassembling a fold rear-view mirror assembly for a motor vehicle, the method comprising:
applying a force to a disengageable retaining mechanism against an elastic element,
rotating the disengageable retaining mechanism causing a flexible retaining element to expand to come out of a shaft recess, and
releasing the force to the disengageable retaining mechanism.

17. The method set forth in claim 16, wherein the fold rear-view mirror assembly includes a base member adapted to be mounted on the motor vehicle, a mirror housing, a shaft arranged to effect rotation of the mirror housing relative to the base member between a mirror operative condition and a mirror folded condition, the elastic element associated with the shaft and arranged such that a force is applied on both the base member and the mirror housing, and the disengageable retaining mechanism, and wherein the disengageable retaining mechanism includes a locking member coupled to the flexible retaining element clamped therein, and the flexible retaining element being movable to the locking member between at least a release position, in which the flexible retaining element can be moved relative to the shaft, and a lock position, in which the flexible retaining element is received in the shaft recess formed in the shaft causing the flexible retaining element to be locked to the shaft so that the elastic element is axially retained against the locking member.

18. The method according to claim 16, wherein the flexible retaining element is a lock spring.

\* \* \* \* \*